UNITED STATES PATENT OFFICE.

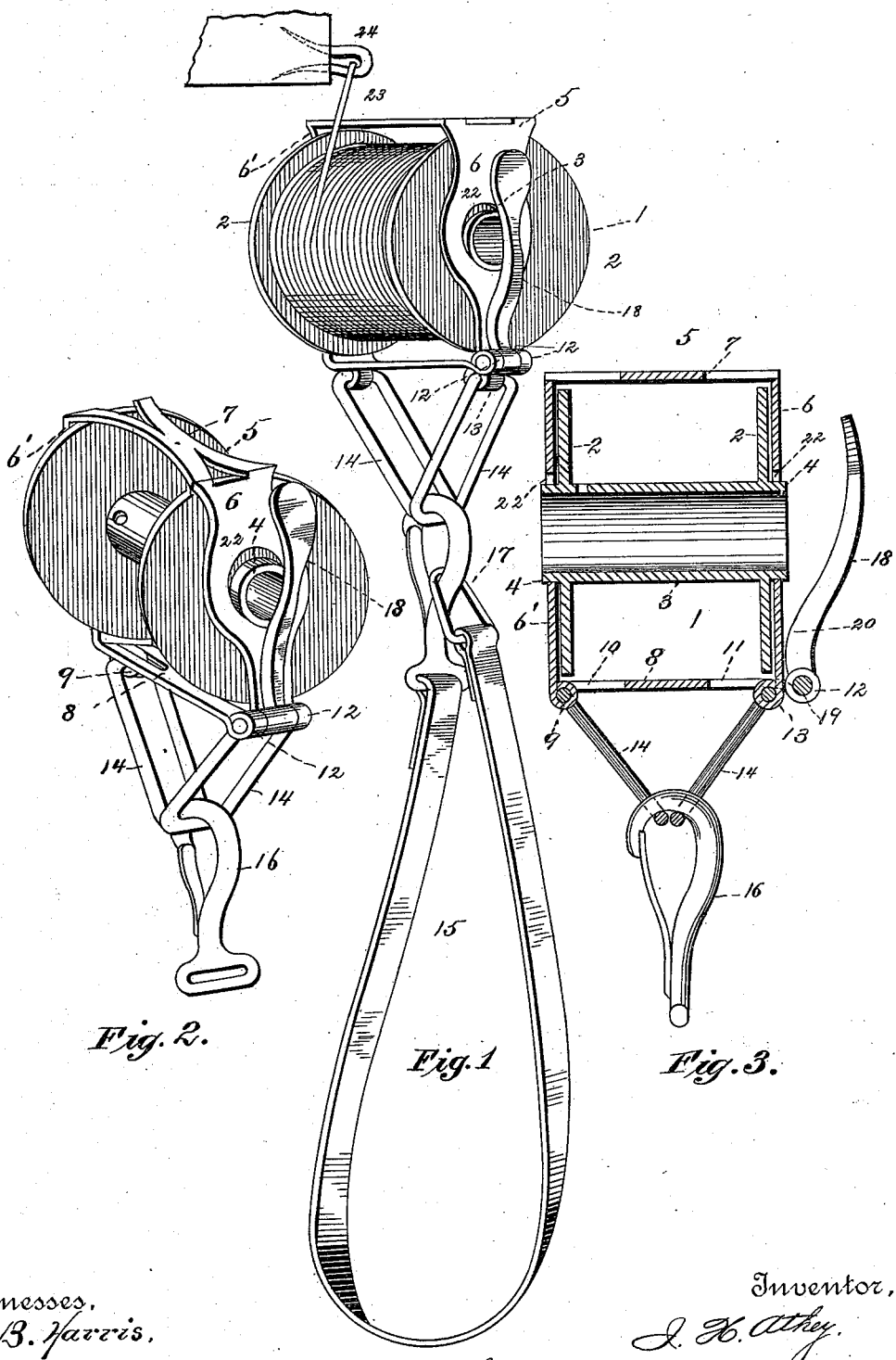

ISAAC H. ATHEY, OF MARION, ARKANSAS.

FIRE-ESCAPE.

SPECIFICATION forming part of Letters Patent No. 402,053, dated April 23, 1889.

Application filed December 27, 1888. Serial No. 294,778. (No model.)

*To all whom it may concern:*

Be it known that I, ISAAC H. ATHEY, a citizen of the United States, residing at Marion, in the county of Crittenden and State of Arkansas, have invented certain new and useful Improvements in Fire-Escapes; and I do hereby declare the following to be a full, clear, and exact description of the invention, such as will enable others skilled in the art to which it appertains to make and use the same.

My invention relates to improvements in portable fire-escapes; and it consists of the novel construction and arrangement of parts, as will be hereinafter fully described and claimed.

The object of my invention is to provide a simple and inexpensive fire-escape which is compactly constructed and can be conveniently carried in a coat-pocket.

A further object of my invention is to provide a fire-escape with a novel supporting-frame for the revoluble spool or drum, which frame is adapted to bind on the lateral faces of the heads of the drum when the weight of a person is suspended from the device in escaping from a building, and thus assist in controlling the drum, the movement of which can be arrested or controlled by a manually-operative lever fulcrumed on said supporting-frame and arranged in operative relation thereto to forcibly compress the laterally-movable sides of said frame upon the head of the spool or drum and cause said sides to bind tightly thereon and arrest the same solely by frictional contact.

In order to provide a perfectly safe and reliable cord or wire for sustaining the weight of the person using the device, and at the same time provide for compactly storing or coiling the cord or wire on the spool or drum and avoid increasing the size and bulk of the device, I prefer to use aluminum wire. I have found by practical experience that an aluminum wire of very small diameter possesses great tensile strength, capable of sustaining at least two hundred and fifty (250) pounds, and that a wire of this kind of sufficient length—say one hundred and fifty (150) feet—can be compactly coiled around a spool or drum of very small diameter to be conveniently carried in a coat-pocket.

To enable others to understand my invention, I will now proceed to describe the same in connection with the accompanying drawings, in which—

Figure 1 is a perspective view of my fire-escape, showing it adjusted for use. Fig. 2 is an enlarged perspective view of the spool or drum and its supporting means with the suspending-wire and body-strap detached. Fig. 3 is a vertical transverse sectional view through the spool or drum.

Referring to the drawings, in which like numerals of reference denote corresponding parts in all the figures, 1 designates the revoluble spool or drum of a fire-escape constructed in accordance with my invention. This spool or drum consists, essentially, of two parallel heads, 2, which are fixed to a central arbor or shaft, 3, preferably made in the form of a cylindrical thimble or tube, the ends of which shaft are extended beyond the lateral exposed faces of the heads, as at 4, to form journals for rotatably supporting the spool or drum in a frame, 5. The supporting-frame 5 for the spool or drum of my escape is preferably made, in practice, of a single stout piece of sheet metal, which is first cut out and then bent up to the necessary shape; but it is obvious that the frame can be made of cast metal, in which event the sides or jaws thereof are joined, so that they can be moved laterally to be compressed upon the heads of the spool or drum.

I have shown my preferred form of supporting-frame in the accompanying drawings, in which the jaws or sides 6 6' and cross-pieces 7 8 are made of a single piece of stout sheet metal sufficient to sustain the weight of the load and then bent up. The cross-piece 7 of the frame is integral with the jaws or sides 6 6' thereof, while the cross-piece 8 is integral with one jaw or side piece, 6', and loosely jointed to the other jaw or side piece of the frame, so that said jaws or side pieces can move laterally of each other and the heads of the drum a limited distance.

The transverse piece 8 of the frame at the point it joins one of the jaws, 6, is provided with an eye or loop, 9, which is made by bending upon itself a tongue or strip that is cut in the middle of said piece 8, thereby leaving a slot, 10, in said transverse piece, and in the free end of this transverse piece I cut a longitudinal slot, 11, and form two eyes or loops, 12, which are made by bending the ends of the divided piece upon itself, as shown in Figs. 2 and 3.

The lower end of the jaw or side 6 is reduced and formed with an eye or loop, 13, that extends through the slot 11 of the transverse piece 8, and to these eyes 9 13 are passed links 14, which depend from the frame and spool. These links are inclined toward each other and meet at their lower ends, so as to intersect a vertical line drawn through the transverse center of the spool or drum, whereby when a load or weight is imposed on the links—as, for instance, a person using the escape—the latter pulls the jaws or sides laterally toward each other and the heads of the spool or drum to compress the jaws on the drum and thereby bind tightly on the same to prevent it from rotating freely.

A body-strap, 15, is provided at one end with a snap-hook, 16, and at its other end with an eye or loop, 17. In use this strap is passed around the person beneath the arms, the loop connected to the snap-hook, and the hook is connected to the free meeting ends of the converging links.

To enable the operator to control his descent, I have provided a brake-lever, 18, which is fulcrumed on the frame and arranged in operative position with relation to one of the jaws or sides of the frame to compress the same upon the heads of the drum. This lever is fulcrumed on a pin or rod, 19, which is fitted in the eyes 12 of the transverse piece 8 of the supporting-frame, and at an intermediate point of its length, preferably near its fulcrum, this lever has a swelled or cam surface, 20, which bears against the jaw 6 of the frame when pressure is applied to the free end of the brake-lever.

It will be noted that when the cam-face 20 of the brake-lever bears against one of the jaws or sides, 6, of the frame a longitudinal strain is exerted on the transverse piece 8, which draws the side or jaw 6' more firmly on the other head of the drum, thus forcing both sides or jaws equally on the spool or drum.

The spool or drum is arranged between the sides or jaws of the frame, and in these sides are formed aligned slots or openings 22, in which the projecting ends or journals 4 of the shaft 3 are journaled, whereby the drum is rotatably mounted in the frame.

The aluminum wire 23 is coiled compactly around the shaft or arbor 3 between the heads 2 of the spool or drum, and one end of the wire is connected to said arbor or shaft, while the other end of said wire passes from the drum at one side of the fixed transverse piece 7.

The operation of my improved fire-escape is as follows: When it is desired to use the escape for the purpose of descending from one of the upper floors of a burning structure, the free end of the wire 23 is secured to the window-sill or other convenient place by means of a staple, 24, which has its legs or prongs flared slightly, so that when the staple is driven into the wood its legs or prongs will spread laterally, to prevent the staple from drawing out of the wood and thus secure the wire against detachment. The body-strap 15 is passed around the body and the hook 16 thereof connected to the meeting ends of the links, after which the brake-lever is grasped to tightly compress the jaws or sides on the spool or drum to enable the operator to control the speed of the drum or spool and the rate which he descends.

I would have it understood that I do not confine myself to the exact details of construction and form and proportion of parts herein shown and described as an embodiment of my invention, as I am aware that changes there can be made without departing from the spirit or sacrificing the advantages of my invention.

I attach importance to the compressible frame having the vertical aligned slots in the sides thereof, the drum or spool arranged between said sides and having its shaft fitted and journaled in said slots, and the brake-lever fulcrumed on one of the jaws, whereby said drum or spool is capable of a limited vertical play in the sides of the frame and of sustaining on its rims or heads the full weight and strain.

Having thus fully described my invention, what I claim as new, and desire to secure by Letters Patent, is—

1. A fire-escape consisting, essentially, of a rotatable spool or drum, a supporting-frame having the compressible sides or jaws in which said drum is journaled, a continuous wire compactly coiled around said drum, and a brake-lever fulcrumed on one of the sides of the frame at or near the free end of the same for simultaneously compressing the jaws to bind on said drum, substantially as and for the purpose described.

2. A fire-escape consisting of a supporting-frame having the compressible jaws, a rotatable spool or drum journaled in said jaws between the latter, the wire coiled around the drum, the depending converging links pivotally connected to the lower ends of the jaws, and a body-strap adapted to be connected to the meeting ends of said converging links, substantially as and for the purpose described.

3. A fire-escape consisting of a supporting-frame having the compressible jaws, a rotatable spool or drum journaled therein between the same, the wire coiled around the drum, the depending links connected to said jaws, a body-strap connected to the meeting ends of said links, and a brake-lever fulcrumed on the frame in opposite position with relation to one of said jaws to positively bear against the latter and draw upon the other jaw to thereby compress both jaws on the spool or drum, substantially as and for the purpose described.

4. A fire-escape consisting of a frame having the compressible jaws or sides, a rotatable spool or drum journaled therein, a wire, and a brake-lever fulcrumed on said frame at a point at one side of the drum and having a cam-face arranged to bear directly against one of said sides or jaws, substantially as and for the purpose described.

5. In a fire-escape, supporting-frame consisting of the compressible jaws connected at one end by a rigid transverse piece and at their other end by a movable cross-piece, said jaws having depending eyes and the movable cross-piece having an eye at one end which is extended beyond the one of said sides, in combination with a spool or drum journaled in said sides between the same, the depending links connected to the eyes of said jaws, a body-strap connected to the links, and a brake-lever fulcrumed in the eye of the movable cross-piece, substantially as described.

6. A fire-escape, substantially as described, consisting of the compressible connected jaws having the transverse aligned slots or openings at intermediate points of their length, a rotatable spool or drum having its shaft journaled in said aligned slots, a wire coiled around said drum, and a brake-lever fulcrumed on one of the jaws for compressing the same on the heads of the drum, substantially as described.

In testimony whereof I affix my signature in presence of two witnesses.

ISAAC H. ATHEY.

Witnesses:
JOHN R. CHASE,
J. H. CLYMANS.